United States Patent
Gonzalez

[11] 3,860,324
[45] Jan. 14, 1975

[54] HAND HELD IMAGE DESIGN REFLECTOR
[76] Inventor: Hector Gonzalez, 745 Hillcrest Dr., Felton, Calif. 95018
[22] Filed: Nov. 2, 1972
[21] Appl. No.: 303,263

[52] U.S. Cl. .................................. 350/5, 353/2
[51] Int. Cl. ........................................ G02b 27/08
[58] Field of Search .......... 350/4, 5, 160 LC; 353/1, 353/2; 272/8 R, 8 M, 8 N, 8 D

[56] References Cited
UNITED STATES PATENTS

| | | | |
|---|---|---|---|
| 2,152,424 | 3/1939 | Wetmore | 353/2 |
| 2,452,363 | 10/1948 | Flotron | 350/4 |
| 3,111,878 | 11/1963 | Wellas et al. | 350/5 |
| 3,647,279 | 3/1972 | Sharpless et al. | 350/160 LC |

OTHER PUBLICATIONS
Science News, 4/25/1970, Vol. 97, No. 17, pp. 417.

*Primary Examiner*—Samuel S. Matthews
*Assistant Examiner*—E. M. O'Connor

[57] ABSTRACT

The present invention is a hand held novelty toy which produces unusual and unexpected image effects resembling a kaleidoscope, but where the viewing objects are manipulated by manual pressure on a flexible or resilient reflecting panel at the rear of the viewing housing. The viewing is through an equilateral three cornered tube where the rear opening is smaller than the front or viewing opening, and where the inner surfaces of the tube have a reflective substance coated thereon or applied thereto. The reflecting panel at the small end of the triangular tube has a friction fit for easy removal and/or replacement:

No rotating movement is required to make the myriad of changes. The reflecting panel may be a transparent sealed double walled — or more — chamber containing fluids and/or objects of almost any nature. All of the reflecting panels or chambers are interchangeable and can be removed and replaced at will, with the friction fit to keep them in place, particularly during manipulation.

3 Claims, 8 Drawing Figures

PATENTED JAN 14 1975　　3,860,324

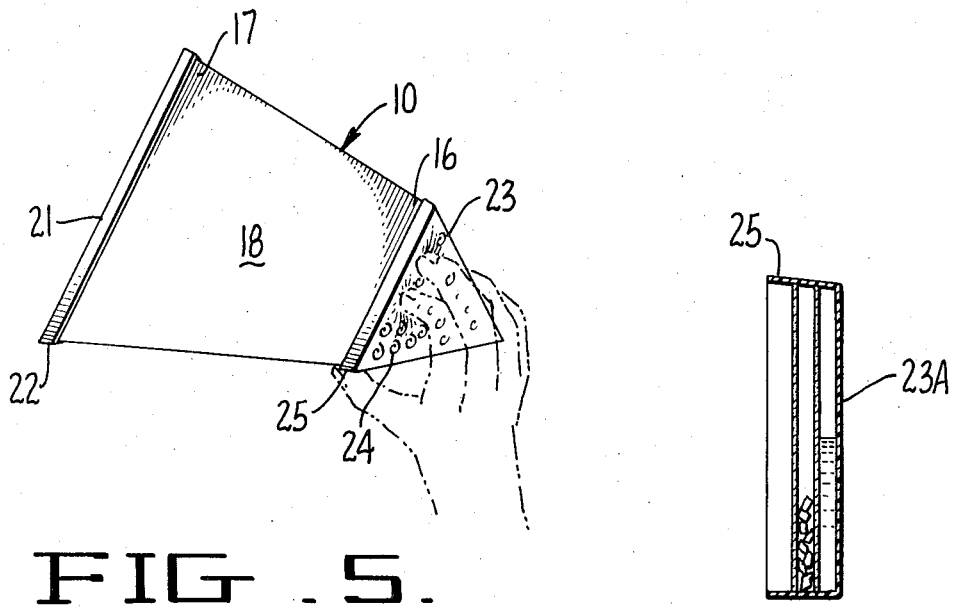
FIG. 5.
FIG. 7.
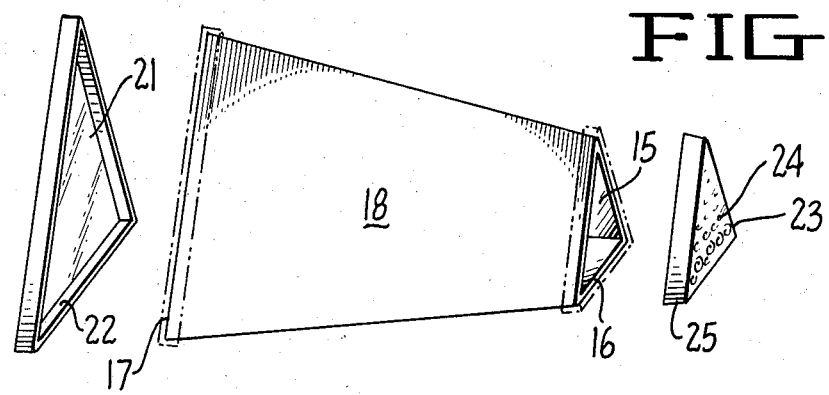
FIG. 6.
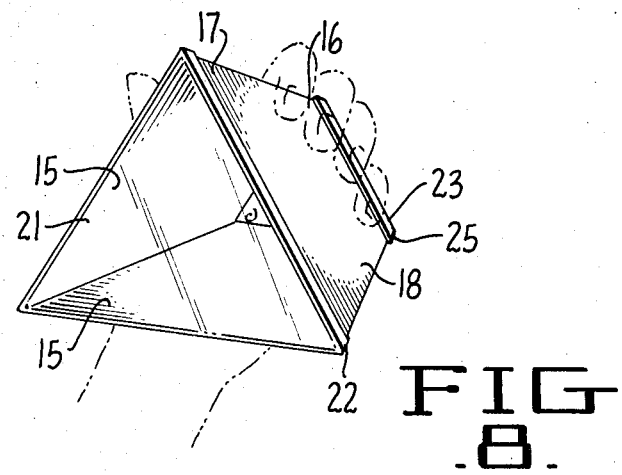
FIG. 8.

HAND HELD IMAGE DESIGN REFLECTOR

HISTORY OF THE INVENTION

Scarcely anyone is unaware of the unusual effects of a hand held kaleidoscope which has amused and delighted persons of all ages for a number of years. The kaleidoscope usually is a tubular cardboard unit with a small peep-hole at the viewing end and a ground glass viewing panel beneath which is a chamber comprised of various loose objects, usually bits of colored glass, and a system of mirrors which break up the reflections into four quadrants. Usually the sole lighting for the kaleidoscope is from the rear and the changing of patterns is accomplished by rotating the tubular portion to produce an almost infinite number of designs. It is quite impossible to hold any one design in position long enough to work from, as the slightest movement will present a wholly new and different series of reflections. From these very simple kaleidoscopic instruments complex machines have been devised with controlled illumination, with a complex series of reflective surfaces. As this art has developed, the trend appears to be away from simplicity toward large sophisticated machines not suitable as a toy or for general viewing and pleasure.

Because it seemed too bad that kaleidoscopic instruments had progressed away from simple viewing delights, it is an object of the present invention to produce a kaleidoscopic-like toy which is effective, easy to assemble and disassemble, and capable of enjoyment by young and old once again. Furthermore, it was an object of the present invention to hand control or manually control with the simplest of movements, the changes of the design reflections by slight movements of the fingers without the necessity of rotating the device.

It is further an object of the present invention to make the viewing area larger than the reflected image area so that squinting through a tiny peep-hole would not be necessary. Furthermore it is a still further object of the present invention, to make the reflecting panel movable and interchangeable with other reflecting panels to further increase the possible combinations and to employ various types of liquids and solids in the establishing of a multitude of design reflections.

Further objects are to provide a construction of maximum simplicity, economy and ease of assembly and disassembly, also such further objects, advantages and capabilities as will fully appear and as are inherently possessed by the device and invention described herein.

The invention further resides in the combination construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

BRIEF DESCRIPTION OF THE DRAWINGS

FIG. 5 is a perspective view from the rear, or small reflecting end, showing the manner of manipulation of the reflecting objectives;

FIG. 6 is a side elevational view of the triangular tube but showing the front clear covering at the viewing end and the reflecting panel, in perspective;

FIG. 7 is a vertical section of the reflecting panel showing the compartmentalization; and FIG. 8 shows the manner of holding the same in one hand while viewing the reflecting objects.

DESCRIPTION OF PREFERRED EMBODIMENTS

Figure 1:
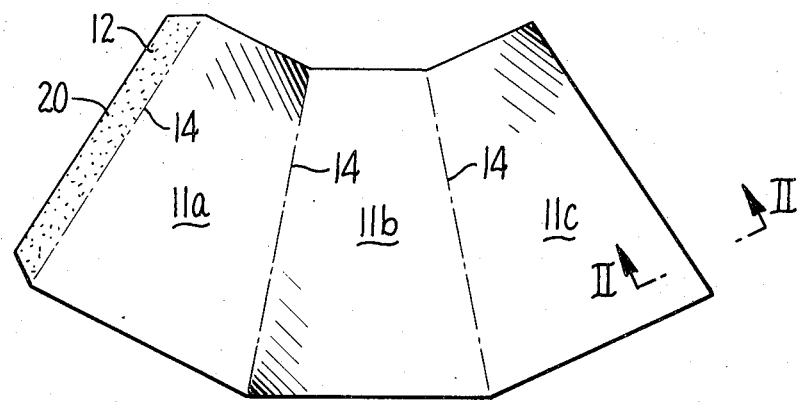
FIG. 1 is a plan view of the shaped pattern or blank for assemblying the equilateral triangular tube.
Figure 2:
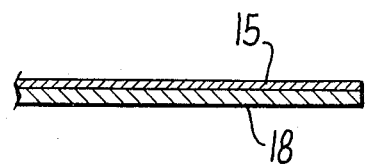
FIG. 2 is a fragmentary section through one of the triangular panels taken on the line II — II of FIG. 1.
Figure 3:
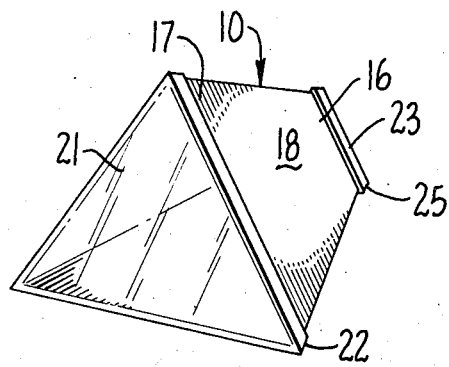
FIG. 3 is a perspective view of the assembled toy from the large viewing end.
Figure 4:
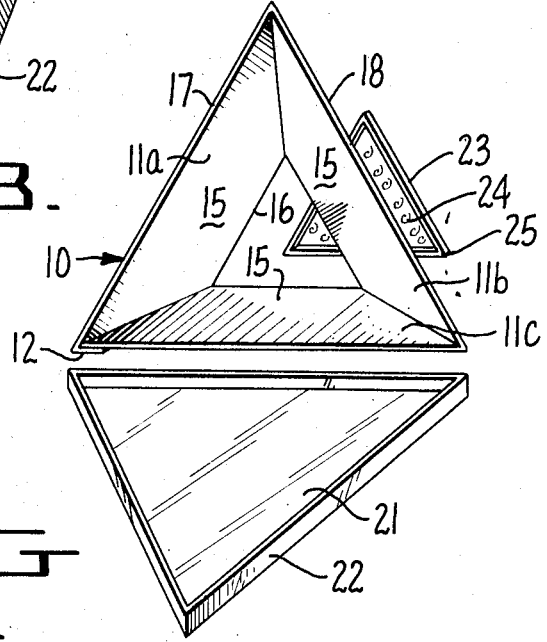
FIG. 4 is a front elevational view of the device looking through from the large end to the small end and showing in perspective the viewing panel separated from the large end of the triangular tube and also showing the small reflecting panel removed behind the small opening.

Referring now more particularly to the drawings, similar parts in the several views are referred to by the same numerals throughout. The blank for making and assembling the hand held toy, generally designated 10, consists of three contiguous truncated pyramidal shaped parts 11a, 11b and 11c having a tab 12 along one of the long edges. This pattern is folded inwardly along the lines 14 to form an equilateral triangular tube having a small reflective end 16 and a large viewing end 17. The inner faces of the parts 11a, 11b and 11c have secured to or on them in any suitable manner, a reflecting surface 15 which can be mirrors, polished aluminum, foil, or any other suitable reflecting material. The outside may be any kind of suitable material such as cardboard or press board which may be folded back to make this particular triangular tube form. The form is best shown in FIG. 4 which shows a perspective of the toy 10 from the front to the rear. The tab 12, of course, is for holding the form of the triangular tube substantially rigid and may have a coating of pressure sensitive adhesive 20 for ease of assembling and disassembling. Any suitable means for forming the tube is contemplated but preferably it is one which can be attached and detached a reasonable number of times without weakening the tube 18 or the means.

The triangular opening 17 at the front of the triangular tube 18 may be covered with a clear transparent plastic 21 forming an equalaterial triangle with inturned flanges 22 for engaging the outer edges of the large viewing opening 17 of the tube in a friction fit for ease of assembling and disassembling. The attachment flange 22 is shown in broken lines in FIGS. 5 and 6.

Likewise at the rear of the triangular tube 11, the opening 16 is covered with the flexible clear plastic equilateral triangle 23 on the surface of which there are printed or otherwise placed certain reflecting objects 24, arranged in any desired manner. The objects 24 may be fluorescent or not as desired. The reflecting panel 23 is detachable secured to the small open end 16 of the body portion by means of flanges 25. These fit with a friction fit over the end 16 so that the reflecting panel 23 may be removed and replaced with another panel 23, or taken off and turned, as the viewer desires.

The reflecting panel 23 is preferably made of a transparent or translucent resilient material so that the reflecting material 24 changes position and changes the reflected image design by slight pressure of the viewer's fingers against the rear of the panel 23.

The reflecting panel 23 can be made compartmental as shown in FIG. 7 with one or more vertical compartments 23A each of which is sealed and water tight so that dry and liquid objects can be used either to float in the liquid or separately moved by shaking, with or without rotation of the body 11. The various vertical sections 23A of the reflecting panel 23 are, of course, clear and permit light to pass therethrough from the rear as well as from the front.

One of the unexpected results of this device is the optical illusion produced by the truncated pyramidal shape. When one views the reflecting objects located at the small end 16 in close proximity to the viewing transparent member 21, the reflections occupy an area a certain distance inwardly from the rear along the reflecting panels 15. As one increases the viewing distance from the transparent member 21, the illusion is created that the reflections do not either increase or decrease in size. It is believed that the angle of the triangular tube from front to rear accounts for this illusion.

OPERATION

The operation of the device 10 requires first assembling the triangular tube which is formed in the manner heretofor described and held together in temporary firmness by the pressure sensitive adhesive 20, or by any other suitable means. Then the transparent plastic viewing panel 21 is placed on the large end 17 with friction fit by the flanges 22 so that the shape of the triangular tube is maintained and its stability increased. Obviously the viewing into the large open end 17 is not noticeably impaired by the transparent panel 21. Then the reflecting panel 23 is inserted over the small end 16 of the triangular tube so that the light will come in from behind the transparent member 23 as well as illuminating the mathematically broken reflections, by light coming through the viewing transparent member 23.

The device may be held in the hand of the user so that the light coming through to the reflecting panel 23 is not impaired. The reflecting objects on the panel 23 are mathematically broken by the various angular reflecting mirrors 15 and fit into a pattern with a direct view through the larger triangular opening 17. These relationships formed at any one time by the reflecting panel 23, may be changed simply by pressing the various portions on the resilient reflecting member 23 from the rear and this will change the sectional reflections that appear in the mirrors 15. There is no particular reason for having any one side of the triangular tubular member in any predesignated position. Reflections can be changed without moving the tubular position.

The reflecting panel 23A may have a series of vertical chambers 23A such as shown in FIG. 7 which panels are air and water tight, being sealed after the reflecting objects have been placed therein. The number or manner of placing the reflecting objects in the compartments is a matter purely of choice in the first instance, and liquids may be placed in one chamber and solids in another as shown in FIG. 7, or any combination of them. It is clearly apparent that the friction fit of the reflecting panel 23 makes it possible to change such panels at any time at the whim of the user. The reflecting panel, whether it be a single pane 23 or a multiple pane unit 23A, are made of flexible light transmitting plastic and are interchangeable one with the other. The viewing panels 23 and 23A being flexible in nature, are subject to distortion by pressure against them which can be varied from heavy to light merely by pressure of one of the fingers of the user. This again produces an infinite number of variations and changes, most of which can be held long enough for some type of reproduction or viewing by the user.

It is observed that all of the benefits claimed herein, as well as those inherent in the device itself are achieved and that this viewer is returned to the simple kaleidoscopic-like effects by the easy manipulations of unskilled hands.

I claim:

1. A hand held toy comprising a three sided truncated pyramidal shaped housing open at both ends, a reflecting material on the interior surface of each side, and a triangular cover for the small end of said housing of light passing material forming a viewing surface, said small end cover having marginal flanges for removable friction fit over said small end of said housing, and light reflecting objects on and partly obstructing light passing through the said outer side of said cover producing non-symetrically divided images in the reflecting interior surfaces of said pyramidal shaped housing, when viewed through the open large end of said housing through which the ambient light passes, said large open end providing a viewing field available to a plurality of viewers simultaneously.

2. The hand held toy of claim 1, wherein the truncated pyramidal shaped housing is temporarily erected from a three panel flat blank for use in its erected shape, the erected form being maintained during use by a transparent cover over the large front end having marginal flanges for removable friction fit thereof and a light passing cover to maintain the erected shape at the small end also having marginal flanges for removable friction fit on said housing.

3. The hand held toy of claim 1, wherein the triangular viewing surface cover at the small end of said housing is multi-compartmented containing various reflective materials and having flexible walls to change the reflected images by varying the pressure against the external surface of said small end cover.

* * * * *